UNITED STATES PATENT OFFICE.

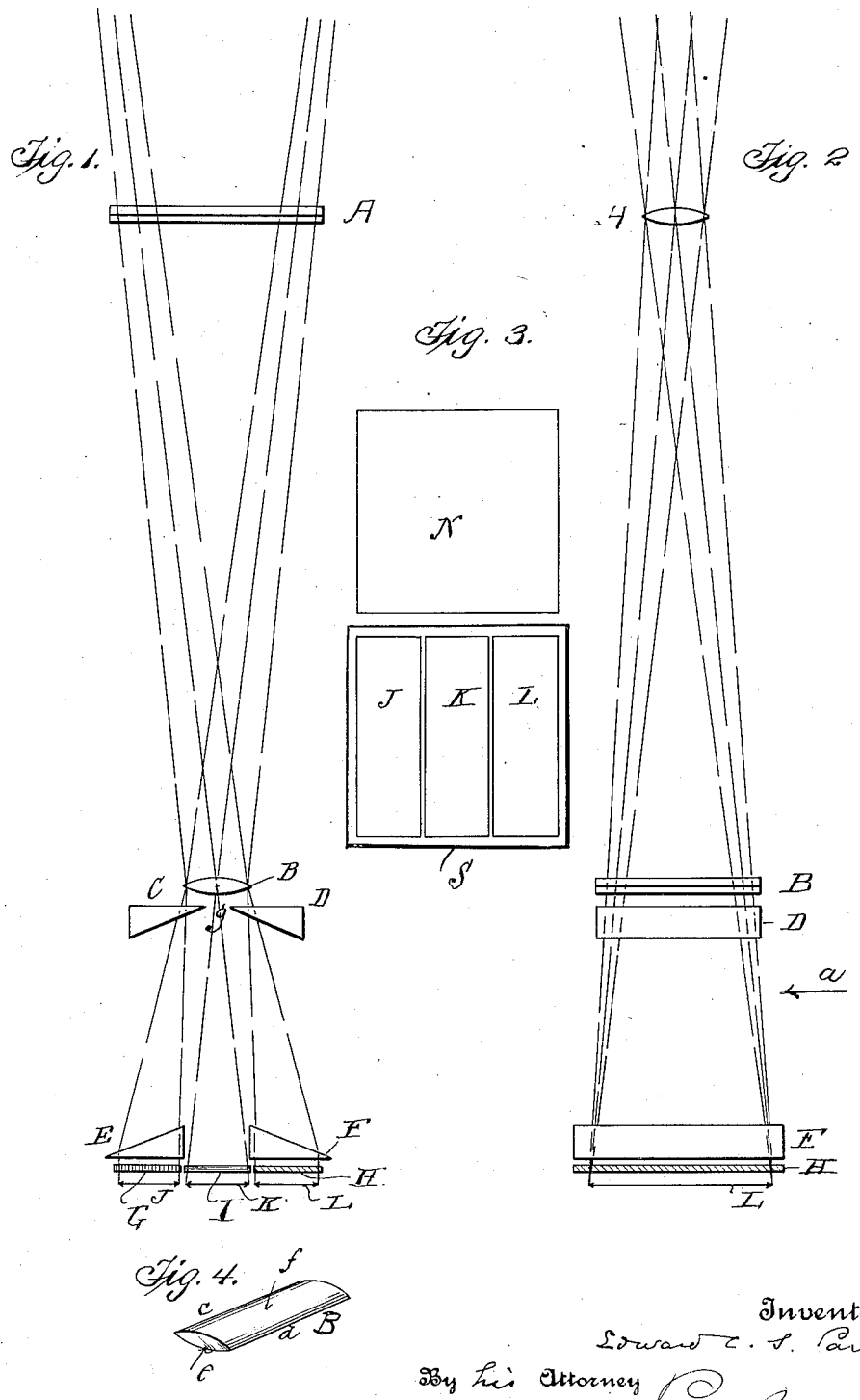

EDWARD C. S. PARKER, OF THE UNITED STATES NAVY.

PHOTOGRAPHIC APPARATUS.

1,328,292.	Specification of Letters Patent.	Patented Jan. 20, 1920.

Application filed May 9, 1919. Serial No. 296,009.

*To all whom it may concern:*

Be it known that I, EDWARD C. S. PARKER, of the United States Navy, a citizen of the United States, have invented a certain new and useful Improvement in Photographic Apparatus, of which the following is a specification.

The invention is an apparatus for making photographs in monochrome from a colored object and projecting an image of said object in corresponding or substantially natural colors upon a suitable screen. That is to say, the apparatus used as a camera produces images of the colored object in monochrome upon a sensitized transparent plate, film, or in general terms "slide", either stationary or moving, the light then proceeding from the object to the slide. When the light is caused to proceed in the reverse direction—that is, through the image on the slide and so through the apparatus to the screen—then an image of the object is projected in substantially natural colors upon said screen and either as a stationary or moving picture. The invention consists more particularly in the construction and arrangement of the lenses and means for dividing the pencil traversing the same into a plurality of separated pencils.

In the accompanying drawings—

Figure 1 is an optical diagram, showing the lenses, prisms and color filters forming the apparatus in plan view. Fig. 2 is an elevation of the apparatus taken in the direction of the arrow *a* in said figure. Fig. 3 represents an image of the object and the corresponding three images formed on the slide. Fig. 4 is a perspective view of either the lens A or B.

Similar numbers and letters of reference indicate like parts.

A is a double convex cylindrical lens; two edges *c*, *d* of the lens are straight and are formed by the junction of oppositely arc-shaped surfaces *e*, *f*. B is similar lens. The lens B is placed with the axis of its curved surfaces relatively perpendicular to the axis of the curved surfaces of lens A, so that the middle point of lens B will be in line with the middle point of lens A, and so that the focal length of lens A shall be greater than the focal length of lens B. Should a pencil of light from a given object traverse either lens A or lens B only, there will be produced upon a slide a more or less confused appearance of intermingled masses of light and shade. When, however, the two lenses A and B are disposed with their axes relatively perpendicular as described, then a complete image of the object is produced, and this image will also be produced if the light pencil from lens A traverse a fraction of the lens B instead of the whole lens.

In rear of lens B, I place two prisms C and D, with their corresponding edges opposed and separated by a gap *g*. These prisms deviate the rays which pass through the two portions of the lens which said prisms overlap, the remaining rays proceeding without deviation directly through the gap *g*. In the paths of the two outer pencils which pass through prisms C, D, I dispose prisms E and F which deviate the said pencils and direct them respectively through the light filters G and H which are placed in a predetermined position. Filter G may be of red glass and will, therefore, cut off the green rays, and filter H may be of green glass and will, therefore, cut off the red rays of said pencils. A third filter I, which may be of blue glass, is interposed in the path of the pencil which passes through the gap *g* and cuts off the yellow rays in said pencil. Three monochrome images J, K, L of the object will, therefore, be produced upon any suitable sensitized slide S placed to receive them, and, as before stated, the image J will be made from light free from green rays, the image K from light free from yellow rays, and the image L from light free from red rays. If the object be in the shape of a parallelogram, for example, as shown in Fig. 3 at N, then the three images will each be of the same object, but by reason of the shapes of the lenses will be narrowed in width; or in other words, the ratio of the dimensions of each image J, K, L will be different from the ratio of the dimensions of the object N.

The three images J, K, L being produced and fixed upon a transparent sensitized slide, if the source of light now be placed in rear of the slide so that the rays therefrom will pass through the apparatus in the reverse direction—that is, through the slide, the light filters G, H, I, the prisms E, F and C, D, and the lenses B and A,—an image of the object in colors corresponding to those of said object (so far as is possible by reproduction of red, blue, green and combinations thereof) will be projected upon any suitable screen. As the images on the slide will be negative, they should be changed to positive in the usual way before projection, if it be desired not to disturb the light filters. Otherwise if the negative slide is retained, the several filters must be exchanged for other filters of complementary colors, as green for red, red for green, and yellow for blue.

In another application for Letters Patent Serial No. 296,008 filed by me May 9, 1919, I have described and claimed the method of producing monochrome images and of projecting the same to reproduce the object in substantially natural colors upon a screen, and also another form of apparatus wherein said method may be embodied. The subject-matter of said application is, therefore, not herein claimed.

I claim:

1. A photographic apparatus, comprising two cylindrical lenses disposed with the axes of their curved surfaces relatively perpendicular, means for dividing the light pencil proceeding from the object through said lenses into a plurality of pencils, a sensitized transparent slide receiving the images produced by said pencils, and light filters respectively of different colors interposed between said dividing means and said slide.

2. A photographic apparatus, comprising two cylindrical lenses disposed with the axes of their curved surfaces relatively perpendicular, means for dividing the light pencil proceeding from the object through said lenses into a plurality of pencils, light filters respectively of different colors disposed at a predetermined interval apart, means for deviating said pencils to cause the same to traverse said light filters, and a sensitized transparent slide receiving the images produced by said pencils.

3. A photographic apparatus, comprising two cylindrical lenses disposed with the axes of their curved surfaces relatively perpendicular, two prisms receiving the light pencil proceeding from said object through said lenses and dividing said pencil into two pencils, a sensitized transparent slide receiving the images produced by said pencils, and light filters respectively of different colors interposed between said prisms and said slide.

4. A photographic apparatus, comprising two cylindrical lenses disposed with the axes of their curved surfaces relatively perpendicular, two prisms receiving the light pencil proceeding from said object through said lenses and dividing said rays into two pencils, light filters respectively of different colors and disposed at a predetermined interval apart, two prisms for deviating said pencils to cause the same to traverse said light filters, and a sensitized transparent slide receiving the images produced by said pencils.

5. A photographic apparatus, comprising two cylindrical lenses disposed successively with the axes of their curved surfaces relatively perpendicular, two prisms receiving the light rays proceeding from said object through certain portions of the second lens, a sensitized transparent slide receiving the images produced by the pencils traversing said prisms and also the image produced by the pencil traversing the remainder of said second lens, and three light filters of different colors, two of said filters being respectively interposed between said prisms and said slide, and the third filter being interposed between said lens and said slide.

6. A photographic apparatus, comprising two cylindrical lenses disposed successively with the axes of their curved surfaces relatively perpendicular, two prisms having their corresponding edges oppositely disposed and overlapping the edges of said second lens, there being a gap between the edges of said prisms, the said prisms respectively receiving light rays proceeding from the object through said overlapped portions of said second lens, a sensitized transparent slide receiving the images produced by the pencils traversing said prisms and also the image produced by the pencil traversing said gap, and three light filters of different colors, two of said filters being respectively interposed between said prisms and said slide, and the third filter being interposed between said lens and said slide.

In testimony whereof I have affixed my signature in presence of two witnesses.

EDWARD C. S. PARKER.

Witnesses:
GERTRUDE T. PORTER,
MAY T. MCGARRY.